(12) United States Patent
Wood et al.

(10) Patent No.: US 11,301,021 B2
(45) Date of Patent: Apr. 12, 2022

(54) SYSTEM AND METHOD TO PREVENT BATTERY UNDER-VOLTAGE SHUTDOWN

(71) Applicant: Dell Products L.P., Round Rock, TX (US)

(72) Inventors: Merle Jackson Wood, Round Rock, TX (US); Andy Liu, Luzhu District (TW); Jessica Chin, New Taipei (TW); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 341 days.

(21) Appl. No.: 16/519,485

(22) Filed: Jul. 23, 2019

(65) Prior Publication Data

US 2021/0026433 A1 Jan. 28, 2021

(51) Int. Cl.
*G06F 1/3212* (2019.01)
*G06F 1/28* (2006.01)
*G06F 1/26* (2006.01)
*G06F 1/3246* (2019.01)

(52) U.S. Cl.
CPC ............ *G06F 1/3212* (2013.01); *G06F 1/263* (2013.01); *G06F 1/28* (2013.01); *G06F 1/3246* (2013.01)

(58) Field of Classification Search
CPC .......... G06F 1/3212; G06F 1/263; G06F 1/28; G06F 1/3246
See application file for complete search history.

(56) References Cited

U.S. PATENT DOCUMENTS

| | | | | |
|---|---|---|---|---|
| 5,140,580 A | * | 8/1992 | Ohara | G11B 7/0045 369/106 |
| 2003/0221132 A1 | * | 11/2003 | Fiebrich | G06F 1/263 713/300 |
| 2004/0243857 A1 | * | 12/2004 | Watnik | G06F 1/206 713/300 |
| 2014/0217958 A1 | * | 8/2014 | Verdun | H02J 7/04 320/107 |
| 2016/0091945 A1 | * | 3/2016 | Shabbir | G06F 1/206 713/300 |
| 2017/0031431 A1 | * | 2/2017 | Khatri | G06F 1/3234 |
| 2020/0264692 A1 | * | 8/2020 | Gorbatov | G06F 1/30 |

* cited by examiner

*Primary Examiner* — Thomas C Lee
*Assistant Examiner* — Brian Lam
(74) *Attorney, Agent, or Firm* — Baker Botts L.L.P.

(57) ABSTRACT

Methods, systems, and computer programs encoded on computer storage medium, for polling a battery management unit (BMU) that is coupled to a battery power source, the polling including identifying parameters associated with the battery power source and are stored by registers; determining that an AC power source is not actively providing power to the IHS; determining that the battery power source does not support dynamic battery power technology (DBPT); determining that the RSoC of the battery power source is greater than a first threshold percentage and less than a second threshold percentage; determining an updated processor peak power (PPP) value based on i) the RSOC, ii) a minimum PPP of the processor at the first threshold percentage, and iii) a maximum PPP of the processor at the second threshold percentage; and updating the registers based on the updated PPP.

20 Claims, 5 Drawing Sheets

SYSTEM AND METHOD TO PREVENT BATTERY UNDER-VOLTAGE SHUTDOWN

BACKGROUND

Field of the Disclosure

The disclosure relates generally to information handling systems, and in particular, preventing battery under-voltage shutdown of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can suffer from unexpected shutdowns when a battery voltage drops below a threshold voltage (e.g., 5 volts) under heavy loading. In some cases, unexpected shutdowns can occur more frequently in systems with batteries that are at lower capacity levels. This can be made worse when the battery is near depletion.

SUMMARY

Innovative aspects of the subject matter described in this specification may be embodied in a method including polling a battery management unit (BMU), of an information handling system (IHS), that is coupled to a battery power source, the polling including identifying one or more parameters associated with the battery power source and are stored by one or more registers, the parameters including an initial maximum peak power (MPP) of the battery power source and the sustained peak power (SPP) of the battery power source of the IHS based on a relative state of charge (RSoC) of the battery power source; after polling the BMU, determining that an AC power source is not actively providing power to the IHS, and in response, determining that the battery power source does not support dynamic battery power technology (DBPT); in response to determining that the battery power supply does not support DBPT, determining that the RSoC of the battery power source is greater than a first threshold percentage and less than a second threshold percentage; in response to determining that RSoC is greater than the first threshold percentage and less than the second threshold percentage, determining an updated processor peak power (PPP) value based on i) the RSOC, ii) a minimum PPP of the processor at the first threshold percentage, and iii) a maximum PPP of the processor at the second threshold percentage; and updating the one or more registers based on the updated PPP.

Other embodiments of these aspects include corresponding systems, apparatus, and non-transitory computer-readable medium storing software comprising instructions executable by one or more computers These and other embodiments may each optionally include one or more of the following features. For instance, in response to determining that the battery does not supports DBPT, determining that the RSoC of the battery power source is less than the first threshold percentage or greater than the second threshold percentage; and in response to determining that the RSoC of the battery power source is less than the first threshold percentage or greater than the second threshold percentage, re-polling the BMU. In response to determining that the AC power source is not actively providing power to the IHS, determining that the battery power source does support DBPT; and in response to determining that the battery power source does support DBPT, determining a power of the IHS based on the MPP, the sustained peak power (SPP), and a system rest of power (ROP). Identifying a thermal MPP based on a temperature of the battery power source; identifying one of the thermal MPP and the updated PPP having the lowest value; and updating the one or more registers with the thermal MPP or the updated PPP having the lowest value. In response to determining that the battery does not supports DBPT, determining whether the RSoC of the battery power source is less than a third percentage threshold, including: when the RSOC of the battery power source is greater than the third percentage threshold, setting processor hot values of the IHS stored by the one or more registers to initial processor hot values associated with the AC power source, and when the RSOC of the battery power source is less than the third percentage threshold, updating the processor hot values of the IHS stored by the one or more registers. The updated PPP value is further based on i) an age of the battery power source, ii) a number of battery percentage levels, iii) a power associated with a discreet graphics processing unit (dGPU) of the IHS, and iv) a power associated with external ports of the IHS After polling the BMU, determining that the AC power source is actively providing power to the IHS, and in response, re-polling the BMU.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes dynamically adjusting a maximum instantaneous power envelope of a processor as the capacity of a battery power source decreases to minimize, if not avoid, malfunctions (crashes) of the processor.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
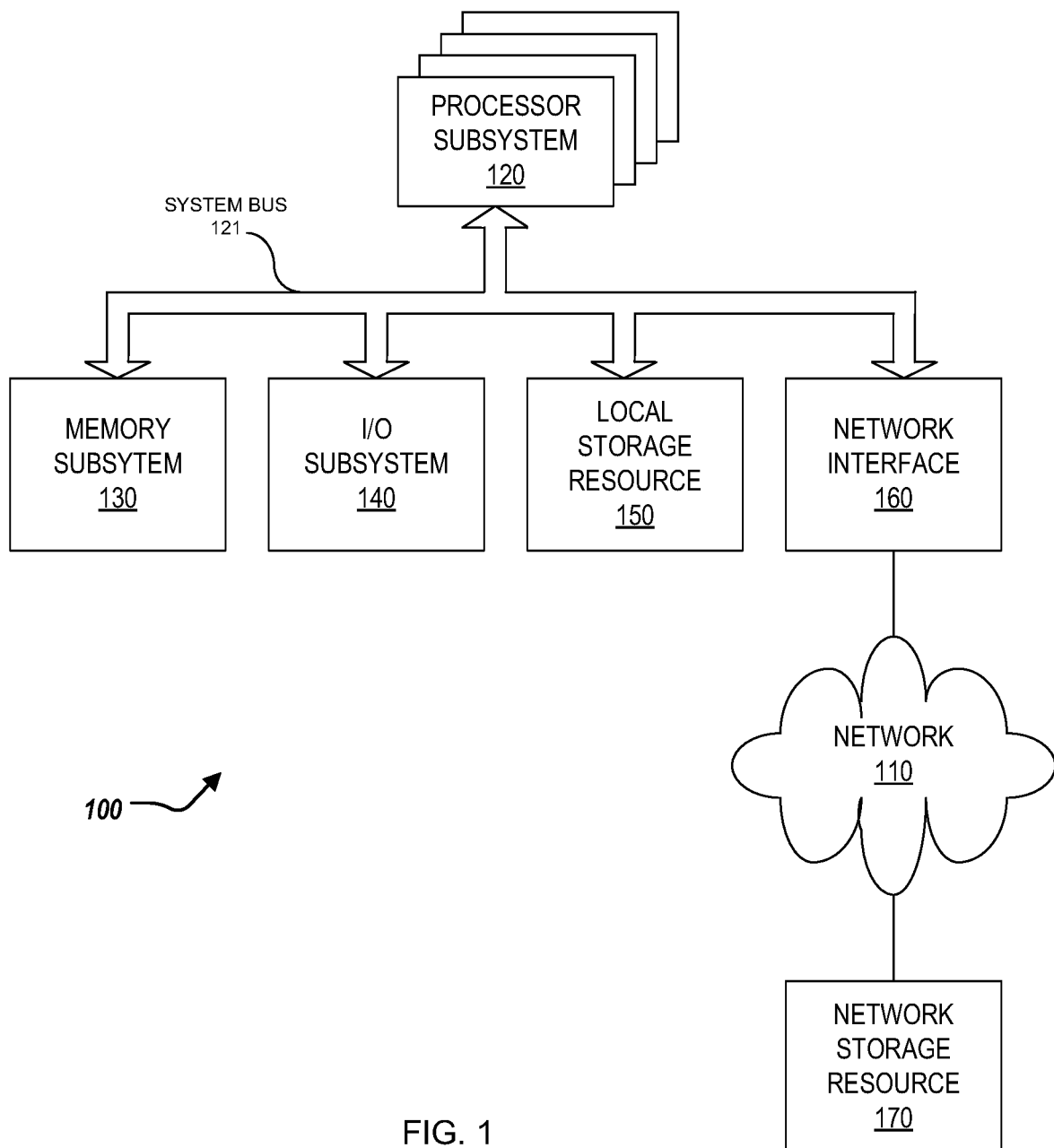
FIGS. 1, 2 illustrates a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
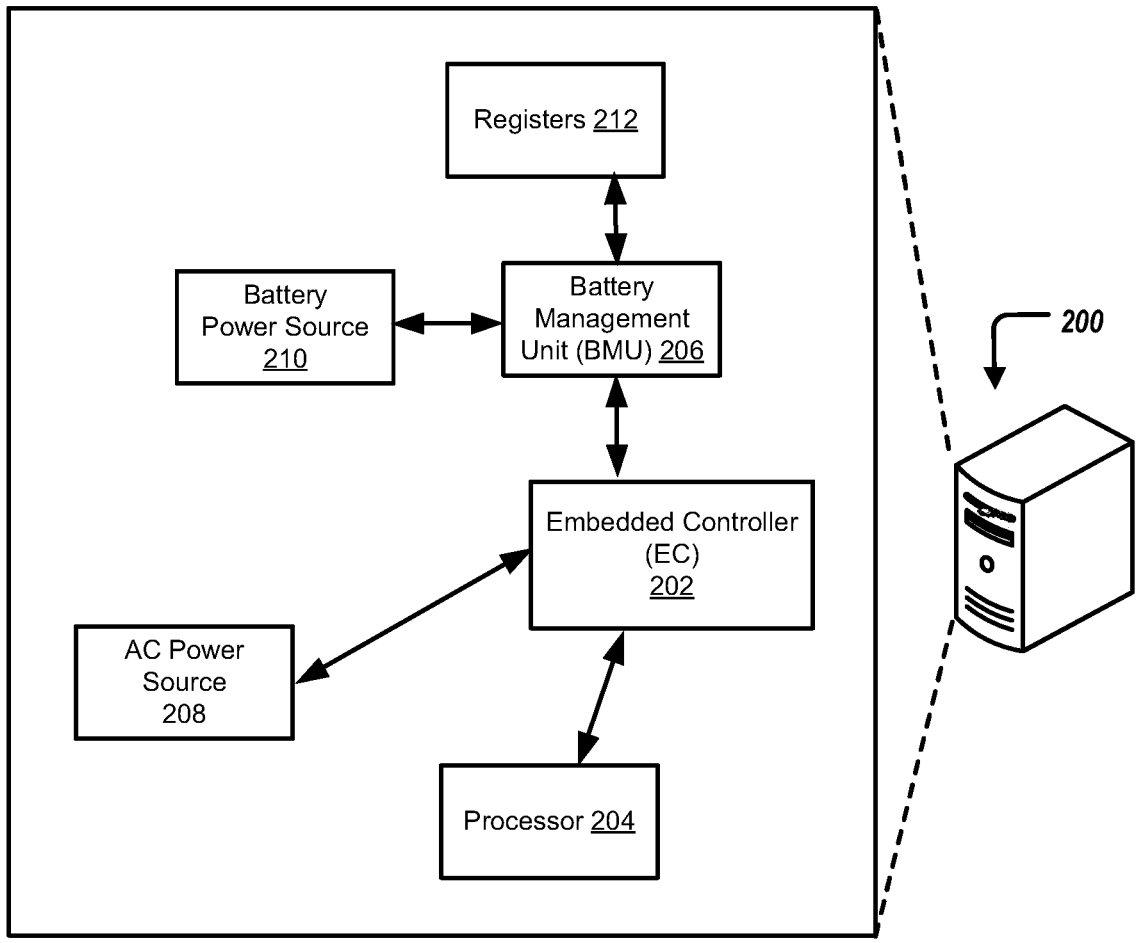

Turning now to FIG. 2, FIG. 2 illustrates an information handling system (IHS) 200. The IHS 200 can include an embedded controller (EC) computing module 202, a processor 204, a battery management unit (BMU) 206, an AC power source 208, a battery power source 210, and registers 212. The EC 202 can be in communication with the AC power source 208, the processor 204, and the BMU 206. The BMU 206 can be in communication with the battery power source 210, and the registers 212. In some examples, the battery power source 210 includes the registers 212. In some examples, the IHS 200 is similar to the information handling system 100 of FIG. 1. In some examples, the processor 204 is similar to the processor subsystem 120 of FIG. 1.

In short, the EC 202 can dynamically adjust a maximum instantaneous power envelope of the processor 204 as the capacity of the battery power source 210 decreases (e.g., drains). Specifically, there can be voltage drops of the IHS 200 between the battery power source 210 and where the power is actually delivered to the IHS 200 due to resistance along such a path of the power. In some cases, when the voltage is below a threshold (e.g., a voltage regulator threshold), a voltage regulator of the IHS 200 can fail and the functioning of the IHS 200 can suffer (e.g., "crash"). Specifically, when the battery power source 210 is at a maximum capacity, the registers 212 (e.g., "PL4 values") can retain the highest CPU power setting. However, as the capacity of the battery power source 210 decreases, the registers 212 can store values to track the maximum battery power delivery capacity while staying above such a threshold.

The registers 212 can store power values—e.g., PL1, PL2, PL3, PL4 values. The PL values are the power levels that the processor 204 functions at. In some examples, PL1 is the average power rating of the processor 204; PL2 is the turbo duration power rating (e.g., 10-30 seconds) of the processor 204; PL3 is an instantaneous power maximum rating of the processor 204; and PL4 is an absolute maximum power rating of the processor 204.

Figure 3:
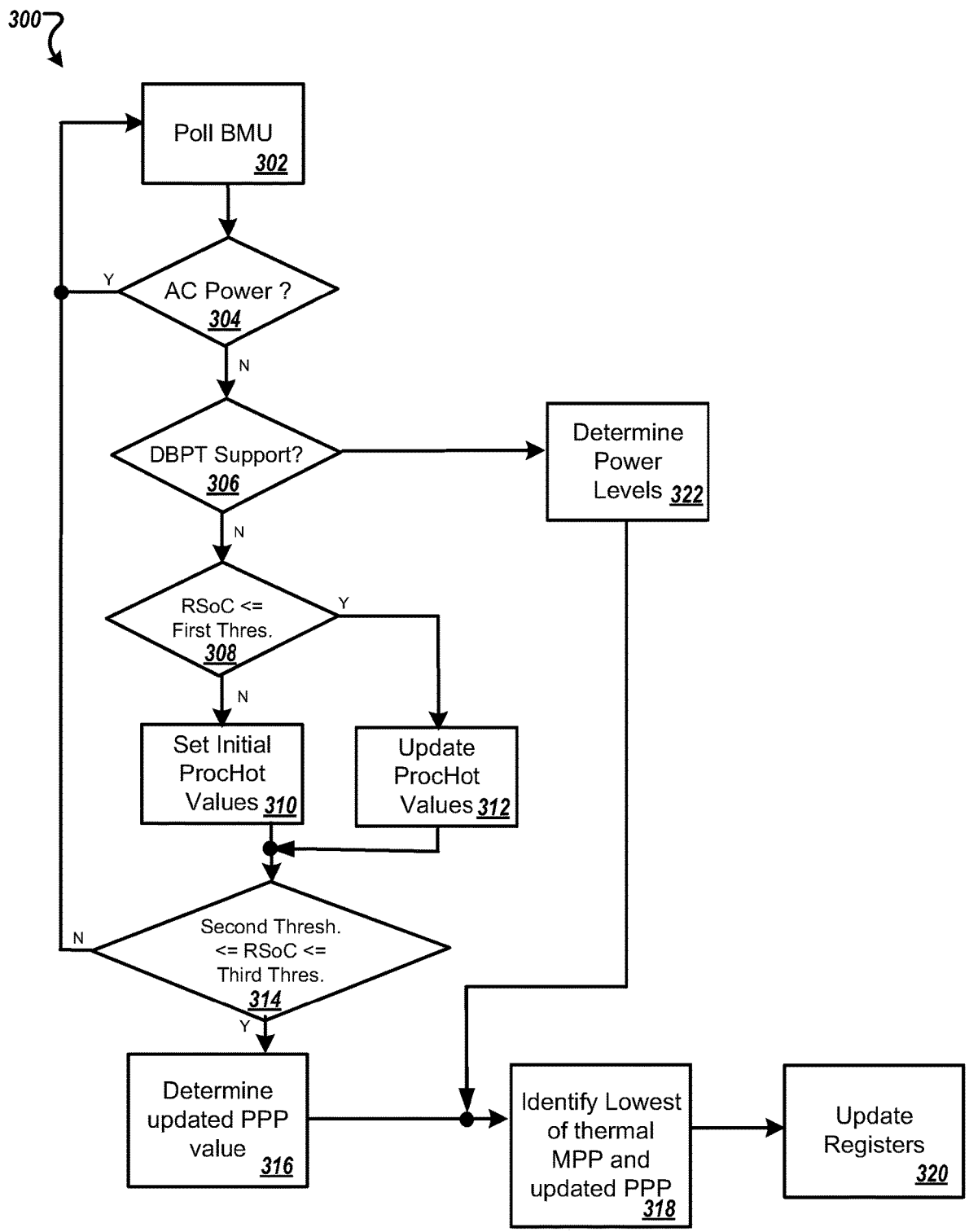
FIG. 3 illustrates a flowchart of a method for preventing battery under-voltage shutdowns.

FIG. 3 illustrates a flowchart depicting selected elements of an embodiment of a method 300 for preventing battery under-voltage shutdowns. The method 300 may be performed by the information handling system 200, the EC 202, and/or the BMU 206, described herein with reference to FIGS. 1-2, or another information handling system. It is noted that certain operations described in method 300 may be optional or may be rearranged in different embodiments.

In some implementations, the EC 202 can poll the BMU 206 including identifying parameters of the battery power source 210 that are stored by the registers 212 (302). Specifically, during booting of the IHS 200, the registers 212 can store default/initial parameter values of the battery power source 210. For example, the parameters can include an initial maximum peak power (MPP) and a sustained peak power (SPP) of the battery power source 210 based on a relative state of charge (RSoC) of the battery power source 210. In some examples, the MPP is the maximum power the battery power source 210 can sustain for approximately 10 milliseconds (e.g. when the battery power source 210 is at 100% RSoC); and the SPP is the sustained power the battery power source 210 can handle for 10 s of seconds (e.g. 10, 20, . . . seconds) (e.g. when the battery power source 210 is at 100% RSoC).

In some examples, the BMU 206 can determine the MPP and the SPP based on an impedance of the IHS 200—e.g., from the battery power source 210 to where the power is actually delivered to the IHS 200. For example, the impedance can include impedance from the battery power source 210, terminals, connectors, cables and any other elements that are between the battery power source 210 and the voltage regulator of the IHS 200.

In some examples, the battery power source 210 can update the registers 212 with updated RSoC, MPP, and SPP periodically—e.g., every 1 millisecond, 1 second. In some examples, the battery power source 210 can update the registers 212 with updated RSoC, MPP, and SPP in response to a request—e.g., every 1 millisecond, 1 second.

In some implementations, after polling the BMU 206, the EC 202 can determine whether the AC power source 208 is actively providing power to the IHS 200 (304). In some examples, the EC 202 can determine that the AC power source 208 is actively providing power to the IHS 200, and can re-poll the BMU 206. In some examples, the EC 202 can determine that the AC power source 208 is not actively providing power to the IHS 200. In response to determining that the AC power source 208 is not actively providing power to the IHS 200, the EC 202 can determine whether the battery power source 210 supports dynamic battery power technology (DBPT) (306). In some examples, DBPT can include an ability of the BMU 206 to report a maximum peak current and sustained peak current of the battery power source 210 that it can supply. In some examples, the EC 202 can determine that the battery power source 210 does not support DBPT.

In response to determining that the battery power source 210 does not support DBPT, the EC 202 can determine whether the RSoC of the battery power source 210 is less than a first percentage threshold (308). For example, the first percentage threshold can be 30%, 25%, or 20%. The first percentage threshold can be based on the impedance of the IHS 200. In some examples, the EC 202 can determine that the RSoC of the battery power source 210 is greater than the first percentage threshold. In response to determining that the RSoC of the battery power source 210 is greater than the first percentage threshold, the EC 202 can set processor hot values ("prochot")—e.g., system voltage prochot values and DC prochot values—stored by the registers 212 to initial prochot values associated with the AC power source 208 (310). Specifically, the prochot values are values that force the processor 204 into its lowest power state (based on a percentage of the overload capability of the AC power source 208). In some examples, the EC 202 can determine that the RSoC of the battery power source 210 is less than (or equal to) the first percentage threshold. In response to determining that the RSoC of the battery power source 210 is less than (or equal to) the first percentage threshold, the EC 202 can update the prochot values stored by the registers 212 (312). The updated prochot values can be based on a current RSoC of the battery power source 210.

In some examples, steps 308, 310, 312 are optional. To that end, in response to determining that the battery power source 210 does not support DBPT, the EC 202 can determine whether the RSoC of the battery power source 210 is greater than (or equal to) a second threshold percentage and less than (or equal to) a third threshold percentage (314). For example, the second threshold can be 20% and the third threshold can be 75%. In some examples, the EC 202 can determine that the RSoC is less than the second threshold percentage or greater than the third threshold percentage. In response to determining that the RSoC is less than the second threshold percentage or greater than the third threshold percentage, the EC 202 can re-poll the BMU at 302.

In some examples, the EC 202 can determine that the RSoC is greater than the second threshold percentage and less than the third threshold percentage. In response to determining that the RSoC is greater than the second threshold percentage and less than the third threshold percentage, the EC 202 can determine an updated processor peak power (PPP) value (316). The EC 202 can determine the updated PPP value ("new PL4") based on the i) the current RSoC ("N"), ii) a minimum PPP of the processor 204 at the second threshold percentage ("MinPL4"), iii) a maximum PPP of the processor 204 at the third threshold percentage ("MaxPL4"), iv) an age of the battery power source 210 ("Aged"), v) a number of battery percentage levels ("n"), vi) a power associated with a discrete graphics processing unit (dGPU) of the IHS 200 ("dGPU_P"), and vii) a power associated with external ports of the IHS 200 ("TYPE C PDO"). For example, the updated PPP can be based on the equation: updated PPP=(MaxPL4−(((MaxPL4−MinPL4)/N)*n))*Aged-dGPU_P-TYPE C PDO. That is, the updated PPP can be based on an interpolation between the maximum and minimum values of the PPP, as well as the battery aging as estimated by a cycle count register. The updated PPP can also be based on the power component of the discreet GPU as well as the type C power contracts (Type-C PDO). For example, the number of battery percentage levels can be 3% increments.

In some examples, the EC 202 can identify a thermal MPP based on a temperature of the battery power source 210. The EC 202 can then identify one of the thermal MPP and the updated PPP having the lowest value (318). For example, the IHS 200 can include a thermal component (not shown) that can track the battery power source 210 thermal condition. If the battery power source 210 is too cold or too hot to operate in its optimal state, the thermal MPP can be set. In some examples, the thermal MPP is based on a contact (skin) temperature of the IHS 200.

The EC 202 can update the registers 212 based on the updated PPP (320). In some examples, the EC 202 updates the registers with the thermal MPP or the updated PPP having the lowest value. For example, the EC 202 can update the registers 212 over a PECI bus.

In some examples, the EC 202 can determine that the battery power source 210 does not support DBPT at 306. In response to determining that the battery power source 210 does not support DBPT, the EC 202 can determine a power of the IHS 200 based on the MPP, the SPP, and the system rest of power (ROP) (322). Specifically, the EC 202 can determine an impedance of the IHS 200 and the minimum voltage and store the same in the registers 212. The EC 202 can determine an updated system power at a PL2 level equal to the SPP, and an updated system power at a PL4 level based on the MPP, the system ROP, the power at the dGPU, and the power at the Type-C PDO. Specifically, the power at the PL4 level can be defined by the equation: MPP-system ROP—power dGPU—power Type-C PDO. In some examples, if the value at the PL4 level (MPP) is less than the value at the PL1 level (average power rating), the EC will set the value of PL4 in the registers for the processor 204 as the value of PL1. The EC 202 can update the registers of the processor 204 to store the updated PL2, PL4 values.

Figures 4, 5:
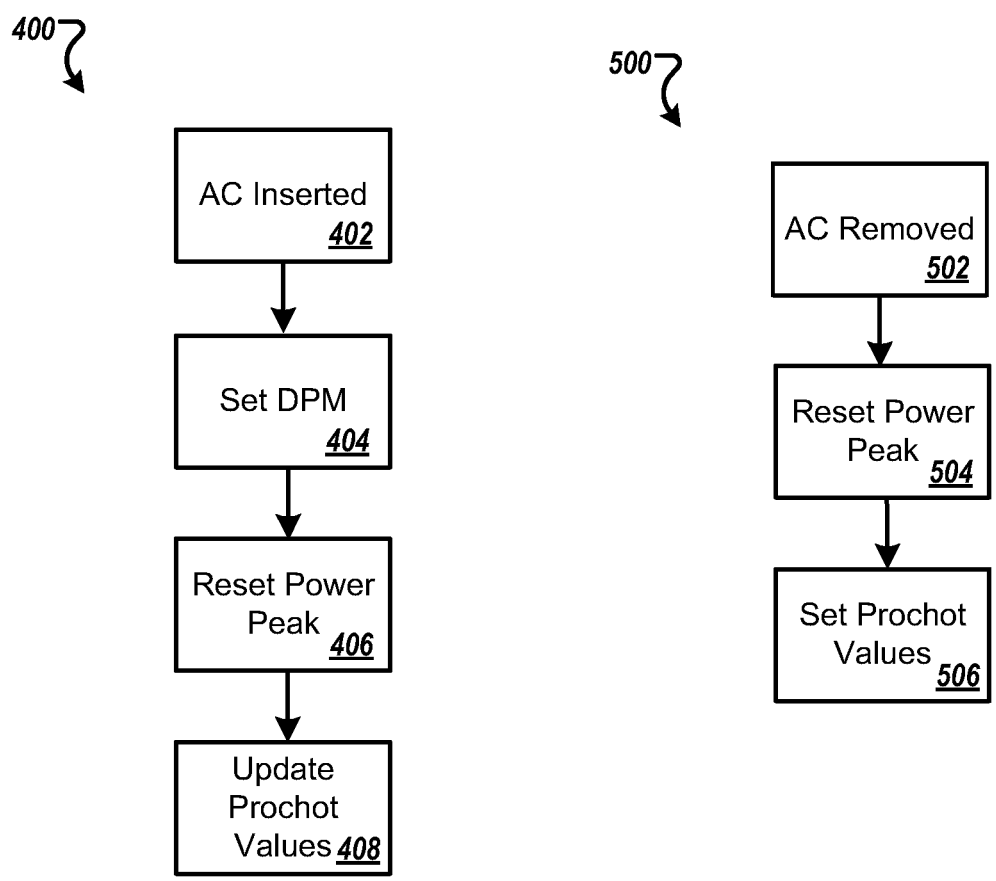
FIG. 4 illustrates a flowchart of a method for setting processor hot values in an AC mode.
FIG. 5 illustrates a flowchart of a method for setting processor hot values in a DC mode.

FIG. 4 illustrates a flowchart depicting selected elements of an embodiment of a method 400 for setting processor hot values in an AC mode. The method 400 may be performed by the information handling system 200, the EC 202, and/or the BMU 206, described herein with reference to FIGS. 1-2, or another information handling system. It is noted that certain operations described in method 400 may be optional or may be rearranged in different embodiments.

The EC 202 determines that the AC power source 208 is actively providing power to the IHS 200 (402). For example, the EC 202 can determine a flag indicator is set indicating that the AC power source 208 is actively providing power to the IHS 200. The EC 202 sets the dynamic power management (DPM) (404). For example, the DPM can be based on a rating of an adapter of the AC power source 208—e.g., a power profile provided by the AC power source 208. The EC 202 resets the peak power (406). Specifically, the EC 202 can reset the power values stored by the processor 204 registers—e.g., the PL1, PL2, PL3, PL4 values. The EC 202 can update the prochot values stored by the registers 212 (408). Specifically, the EC 202 can update the system voltage prochot values, and DC prochot values for the IHS 200 for the AC mode (e.g., when the AC and DC modes have different settings).

FIG. 5 illustrates a flowchart depicting selected elements of an embodiment of a method 500 for setting processor hot values in a DC mode. The method 500 may be performed by the information handling system 200, the EC 202, and/or the BMU 206, described herein with reference to FIGS. 1-2, or another information handling system. It is noted that certain operations described in method 500 may be optional or may be rearranged in different embodiments.

The EC 202 determines that the AC power source 208 is not actively providing power to the IHS 200 (502). For example, the EC 202 can determine that a flag indicator is set indicating that the AC power source 208 is not actively providing power to the IHS 200. The EC 202 resets the peak power (504). Specifically, the EC 202 can reset the power values stored by the processor 204 registers—e.g., the PL1, PL2, PL3, PL4 values. The EC 202 can set the prochot values stored by the registers 212 (506). Specifically, the EC 202 can set the system voltage prochot values, and DC prochot values for the IHS 200 for the DC mode (e.g., when the AC and DC modes have different settings).

Figure 6:
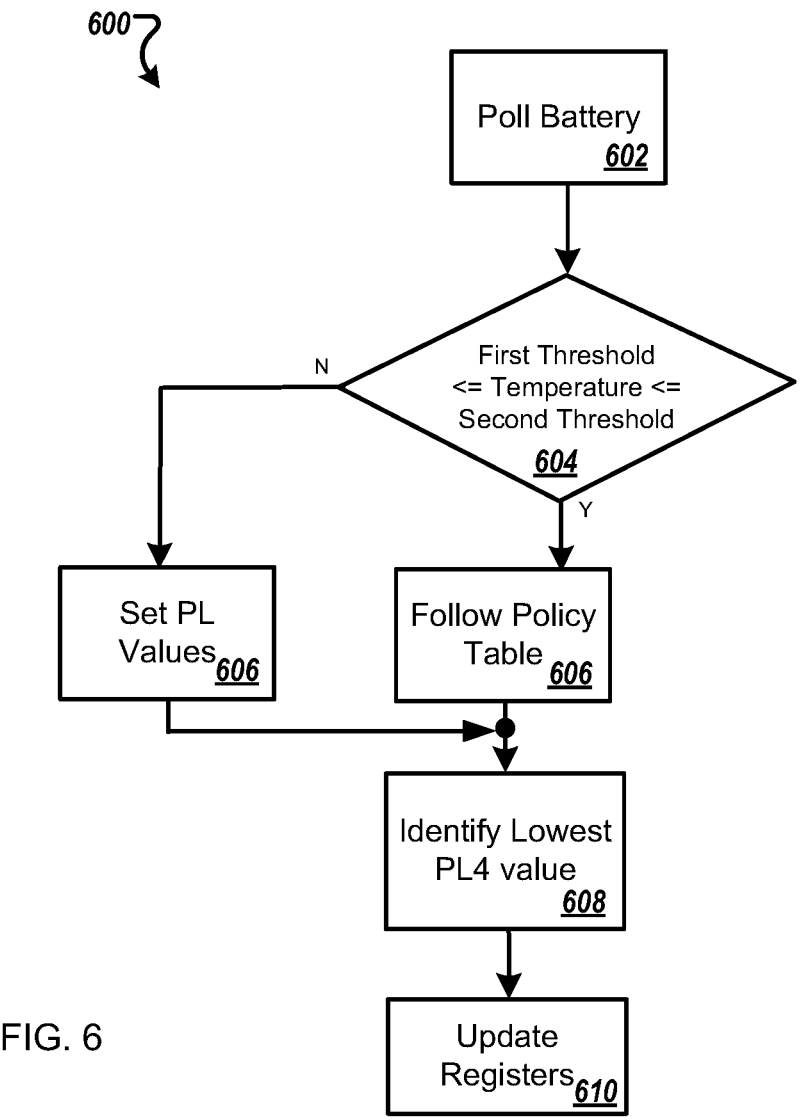
FIG. 6 illustrates a flowchart of a method for determining thermals of a processor.

FIG. 6 illustrates a flowchart depicting selected elements of an embodiment of a method 600 for determining thermals of the processor. The method 600 may be performed by the information handling system 200, the EC 202, and/or the BMU 206, described herein with reference to FIGS. 1-2, or another information handling system. It is noted that certain operations described in method 600 may be optional or may be rearranged in different embodiments.

The EC 202 polls the battery power source 210 to identify a temperature ("thermals") of the battery power source 210 (602). For example, the battery power source 210 polls the battery power source 210 in predetermined intervals (e.g., every second). The EC 202 determines whether the battery temperatures is between a first temperature threshold and a second temperature threshold (604). For example, the first temperature threshold can be 15° Celsius and the second temperature threshold can be 45° Celsius. In some examples, the EC 202 determines that the battery temperature is greater than (or equal) to the first temperature threshold and less than (or equal to) the second temperature threshold. In response, the EC 202 can access a PLx policy table to determine the PL4 value as stored by the processor 204 registers (606). The PLx policy table can be based on the capability of the input source (e.g., the battery power source 210 and/or the AC power source 208). In some examples, the EC 202 determines that the battery temperature is less than the first temperature threshold or greater than the second temperature threshold. In response, the EC 202 can set the PL4 value equal to the PL2 value in the processor 204 registers (608). The EC 202 can identify one of the thermal MPP and the battery state of charge MPP having the lowest value (610). The EC 202 can update the registers 212 based on the thermal MPP or the battery state of charge MPP having the lowest value. For example, the EC 202 can update the registers 212 over a PECI bus.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
   polling a battery management unit (BMU), of an information handling system (IHS), that is coupled to a battery power source, the polling including identifying one or more parameters associated with the battery power source and are stored by one or more registers, the parameters including an initial maximum peak power (MPP) of the battery power source and the sustained peak power (SPP) of the battery power source of the IHS based on a relative state of charge (RSoC) of the battery power source;
   after polling the BMU, determining that an AC power source is not actively providing power to the IHS, and in response, determining that the battery power source does not support dynamic battery power technology (DBPT);
   in response to determining that the battery power supply does not support DBPT, determining that the RSoC of the battery power source is greater than a first threshold percentage and less than a second threshold percentage;
   in response to determining that RSoC is greater than the first threshold percentage and less than the second threshold percentage, determining an updated processor peak power (PPP) value based on the RSoC, a minimum PPP of the processor at the first threshold percentage, and a maximum PPP of the processor at the second threshold percentage; and
   updating the one or more registers based on the updated PPP for processor power level control.

2. The computer-implemented method of claim 1, further comprising:
   in response to determining that the battery does not supports DBPT, determining that the RSoC of the battery power source is less than the first threshold percentage or greater than the second threshold percentage; and in response to determining that the RSoC of the battery power source is less than the first threshold percentage or greater than the second threshold percentage, re-polling the BMU.

3. The computer-implemented method of claim 1, further comprising:

in response to determining that the AC power source is not actively providing power to the IHS, determining that the battery power source does support DBPT; and in response to determining that the battery power source does support DBPT, determining a power of the IHS based on the MPP, the sustained peak power (SPP), and a system rest of power (ROP).

4. The computer-implemented method of claim 1, further comprising:

identifying a thermal MPP based on a temperature of the battery power source;

identifying one of the thermal MPP and the updated PPP having the lowest value; and updating the one or more registers with the thermal MPP or the updated PPP having the lowest value.

5. The computer-implemented method of claim 1, further comprising:

in response to determining that the battery does not supports DBPT, determining whether the RSoC of the battery power source is less than a third percentage threshold, including:

when the RSoC of the battery power source is greater than the third percentage threshold, setting processor hot values of the IHS stored by the one or more registers to initial processor hot values associated with the AC power source, and when the RSoC of the battery power source is less than the third percentage threshold, updating the processor hot values of the IHS stored by the one or more registers.

6. The computer-implemented method of claim 1, wherein the updated PPP value is further based on i) an age of the battery power source, ii) a number of battery percentage levels, iii) a power associated with a discreet graphics processing unit (dGPU) of the IHS, and iv) a power associated with external ports of the IHS.

7. The computer-implemented method of claim 1, further comprising after polling the BMU, determining that the AC power source is actively providing power to the IHS, and in response, re-polling the BMU.

8. A system comprising a processor having access to non-transitory memory media storing operations executable by the processor to:

polling a battery management unit (BMU), of an information handling system (IHS), that is coupled to a battery power source, the polling including identifying one or more parameters associated with the battery power source and are stored by one or more registers, the parameters including an initial maximum peak power (MPP) of the battery and the sustained peak power of the battery power source of the IHS based on a relative state of charge (RSoC) of the battery power source;

after polling the BMU, determining that an AC power source is not actively providing power to the IHS, and in response, determining that the battery power source does not support dynamic battery power technology (DBPT);

in response to determining that the battery power supply does not supports DBPT, determining that the RSoC of the battery power source is greater than a first threshold percentage and less than a second threshold percentage;

in response to determining that RSoC is greater than the first threshold percentage and less than the second threshold percentage, determining an updated processor peak power (PPP) value based on the RSoC, and an interpolation between a minimum PPP of the processor at the first threshold percentage, and a maximum PPP of the processor at the second threshold percentage; and updating the one or more registers based on the updated PPP for processor power level control.

9. The system of claim 8, the operations further comprising:

in response to determining that the battery does not supports DBPT, determining that the RSoC of the battery power source is less than the first threshold percentage or greater than the second threshold percentage; and in response to determining that the RSoC of the battery power source is less than the first threshold percentage or greater than the second threshold percentage, re-polling the BMU.

10. The system of claim 8, the operations further comprising in response to determining that the AC power source is not actively providing power to the IHS, determining that the battery power source does support DBPT; and in response to determining that the battery power source does support DBPT, determining a power of the IHS based on the MPP, the SPP, and a system rest of power (ROP).

11. The system of claim 8, the operations further comprising:

identifying a thermal MPP based on a temperature of the battery power source;

identifying one of the thermal MPP and the updated PPP having the lowest value; and updating the one or more registers with the thermal MPP or the updated PPP having the lowest value.

12. The system of claim 8, the operations further comprising:

in response to determining that the battery does not supports DBPT, determining whether the RSoC of the battery power source is less than a third percentage threshold, including:

when the RSoC of the battery power source is greater than the third percentage threshold, setting processor hot values of the IHS stored by the one or more registers to initial processor hot values associated with the AC power source, and when the RSoC of the battery power source is less than the third percentage threshold, updating the processor hot values of the IHS stored by the one or more registers.

13. The system of claim 8, wherein the updated PPP value is further based on i) an age of the battery power source, ii) a number of battery percentage levels, iii) a power associated with a discreet graphics processing unit (dGPU) of the IHS, and iv) a power associated with external ports of the IHS.

14. The system of claim 8, the operations further comprising after polling the BMU, determining that the AC power source is actively providing power to the IHS, and in response, re-polling the BMU.

15. A non-transitory computer-readable medium storing software comprising instructions executable by one or more computers which, upon such execution, cause the one or more computers to perform operations comprising:
  polling a battery management unit (BMU), of an information handling system (IHS), that is coupled to a battery power source, the polling including identifying one or more parameters associated with the battery power source and are stored by one or more registers, the parameters including an initial maximum peak power (MPP) of the battery power source and the sustained peak power (SPP) of the battery power source of the IHS based on a relative state of charge (RSoC) of the battery power source;
  after polling the BMU, determining that an AC power source is not actively providing power to the IHS, and in response, determining that the battery power source does not support dynamic battery power technology (DBPT);
  in response to determining that the battery power supply does not supports DBPT, determining that the RSoC of the battery power source is greater than a first threshold percentage and less than a second threshold percentage;
  in response to determining that RSoC is greater than the first threshold percentage and less than the second threshold percentage, determining an updated processor peak power (PPP) value based on the RSoC, and an interpolation between a minimum PPP of the processor at the first threshold percentage, and a maximum PPP of the processor at the second threshold percentage; and
  updating the one or more registers based on the updated PPP for processor power level control.

16. The computer-readable medium of claim 15, the operations further comprising:
  in response to determining that the battery does not supports DBPT, determining that the RSoC of the battery power source is less than the first threshold percentage or greater than the second threshold percentage; and
  in response to determining that the RSoC of the battery power source is less than the first threshold percentage or greater than the second threshold percentage, re-polling the BMU.

17. The computer-readable medium of claim 15, the operations further comprising
  in response to determining that the AC power source is not actively providing power to the IHS, determining that the battery power source does support DBPT; and
  in response to determining that the battery power source does support DBPT, determining a power of the IHS based on the MPP, the SPP, and a system rest of power (ROP).

18. The computer-readable medium of claim 15, the operations further comprising:
  identifying a thermal MPP based on a temperature of the battery power source;
  identifying one of the thermal MPP and the updated PPP having the lowest value; and
  updating the one or more registers with the thermal MPP or the updated PPP having the lowest value.

19. The computer-readable medium of claim 15, the operations further comprising:
  in response to determining that the battery does not supports DBPT, determining whether the RSoC of the battery power source is less than a third percentage threshold, including:
  when the RSoC of the battery power source is greater than the third percentage threshold, setting processor hot values of the IHS stored by the one or more registers to initial processor hot values associated with the AC power source, and
  when the RSoC of the battery power source is less than the third percentage threshold, updating the processor hot values of the IHS stored by the one or more registers.

20. The computer-readable medium of claim 15, wherein the updated PPP value is further based on i) an age of the battery power source, ii) a number of battery percentage levels, iii) a power associated with a discreet graphics processing unit (dGPU) of the IHS, and iv) a power associated with external ports of the IHS.

* * * * *